United States Patent [19]

Okuyama

[11] Patent Number: 5,651,027
[45] Date of Patent: Jul. 22, 1997

[54] NON-INSTANTANEOUS DISCONNECTION SWITCHING SYSTEM

[75] Inventor: Keiichi Okuyama, Tokyo, Japan

[73] Assignee: NEC Corporation, Tokyo, Japan

[21] Appl. No.: 397,772

[22] Filed: Mar. 2, 1995

[30] Foreign Application Priority Data

Mar. 2, 1994 [JP] Japan ................................ 6-058184

[51] Int. Cl.⁶ .......................................................... H04K 1/10
[52] U.S. Cl. ........................................ 375/260; 340/825.01
[58] Field of Search ................................. 375/259, 260,
375/220, 257; 455/67.1, 59, 103, 33.2;
370/16; 379/16, 60; 340/825.01, 825, 825.03

[56] References Cited

U.S. PATENT DOCUMENTS 5,155,859  10/1992  Harris et al. ............................ 370/16 X
5,323,144  6/1994  Imai et al. ............................... 375/260

*Primary Examiner*—Stephen Chin
*Assistant Examiner*—Kevin Kim
*Attorney, Agent, or Firm*—Sughrue, Mion, Zinn, Macpeak & Seas

[57] ABSTRACT

When transmitting signals to the respective two paths having a routing length difference on a transmitting side, a signal identifying one and the other of the respective two paths is given to the transmission signal before transmission to one and the other of the paths. On the receiving side, after the two paths have been intentionally switched in the state of non-instantaneous disconnection from one path to the other under external control, a change from the signal identifying one of the paths to the signal identifying the other path is detected.

2 Claims, 2 Drawing Sheets

NON-INSTANTANEOUS DISCONNECTION SWITCHING SYSTEM

BACKGROUND OF THE INVENTION

The present invention relates to a non-instantaneous disconnection switching system and, more particularly, to a transmission path switching method in a digital transmission system, for switching two path NNI (network node interface) frame signals without instantaneous disconnection, which are applied from opposite apparatuses along different paths having different routing lengths between one another under an external control.

In the conventional non-instantaneous disconnection switching system, when changing routings or transmission path constitution while one of two transmission paths having different routing lengths is used for transmission, the two paths are switched intentionally by non-instantaneous disconnection switching from one to the other under external control.

Transmission between opposite apparatuses which are connected to each other by paths 100 and 101 providing the routing length difference as shown in FIG. 2, is made as follows. To the signal received in an IF (interface) receiver unit 1, a path ID inserter 1a inserts a unique path ID representative of a path which is connected thereto. The signal with the unique path ID given by the path ID inserter 1a is branched by a cross connection switch 2 into two branches, which are transmitted via IF (interface) transmitter units 9 and 10 and paths 100 and 101 to different apparatuses.

In the opposite apparatus, path ID detectors 5a and 6a in the IF receiver units 5 and 6 detect path IDs respectively from the signals applied through the paths 100 and 101 and produce the detected path IDs to a comparator 50. This comparator 50 compares the detected path IDs. If the compared path IDs are identical, a cross connection switch 7 controls the path connection such that the respective outputs of the IF receiver units 5 and 6 are connected to the IF transmitter unit 11. The IF receiver units 5 and 6, like the IF receiver unit 1, are provided with path ID inserters 5b and 6b, but in this case the path ID inserters 5b and 6b are not used.

The IF transmitter unit 11 delays the signal through the routing length of the shorter path for adjusting the routing length difference between the paths 100 and 101. For example, in case where the path 100 is shorter in the routing length than the path 101, the IF transmitter unit 11 provides delay to the signal from the path 100 for the delay adjustment such that an amount of the delay of the signal through the path 100 is the same as that of the signal through the path 101.

After the delay adjustment, a data comparator 11a in the IF transmitter unit 11 compares the signals from the respective paths 100 and 101 for a check as to whether the two signals are coincident. In response to the detection of the coincidence; and of the signals, a selector 11b switches the path 100 over to the path 101. In this way, the non-instantaneous disconnection switching of the paths may be effected.

When the non-instantaneous disconnection path switching is effected by the selector 11b, a path ID detector 11c detects path IDs from the signal through the path 100 before the switching and the signal through the path 101 after the switching.

The IF transmitter units 9 and 10, like the IF transmitter unit 11, comprise data comparators 9a and 10a, selectors 9b and 10b, and path ID detectors 9c and 10c. These circuits operate such that signals from the cross connection switch 2 are directly coupled to the respective paths 100 and 101.

According to the above conventional non-instantaneous disconnection switching method, in response to the switching of one of the two paths to the other or vice versa, this switching is confirmed by reading a signal of the switching control terminal of the selector. This means that if the selector is in trouble, resulting in failure of normal switching control so that no signal switching operation is effected, it is impossible to detect that no signal switching operation has been effected. In this case, if the cross connection setting of the signal on the switching side (cross connection switch 7) is released under the assumption that the switching of the signal has been effected, it leads to a disconnection of the high reliability signal that is transmitted by using the non-instantaneous disconnection switching apparatus.

SUMMARY OF THE INVENTION

An object of the present invention is therefore to provide a non-instantaneous disconnection switching apparatus capable of solving the above problem and confirmation of the fact that actually non-instantaneous disconnection signal switching is effected normally.

According to the present invention, there is provided a non-instantaneous disconnection switching system for non-instantaneously disconnection switching branched transmission signals through a first and a second transmission paths, the branched transmission signals being input with identification information provided thereto through the first and second transmission paths, comprising: a first and a second information provision means provided in the respective first and second transmission paths such as to provide a first and a second pieces of identifying information for identifying their own first and second transmission paths to the transmission signals through their own transmission paths, and confirming means for confirming, when non-instantaneously disconnection switching is effected for the transmission signals from the first and second transmission paths, the switching of the transmission signals based on the first and second pieces of identification information.

According to another aspect of the present invention, there is provided a data transmission system between opposite apparatuses which are connected to each other via a first path and a second path comprising:

a first path ID inserter for giving a signal received by an IF receiver a unique path ID representative of a path which is connected to the IF receiver;

a cross connection switch for branching the signal with the unique path ID into two branched signals to be transmitted respectively to the opposite apparatus through a first and a second IF transmitters and the first and second paths, the first and second IF transmitters operating such that the signal from the cross connection switch is transmitted directly to the first and second paths;

a second and a third path ID inserters for providing their own path ID for identifying the respective first and second paths to the signals from the cross connection switch before transmission to the first and second paths;

a first and a second path ID detectors of a first and second IF receivers in the opposite apparatus for detecting the path IDs inserted by the first path ID inserter from the signals applied via the first and second paths;

a first comparator for comparing the detected path IDs;

a second cross connection switch for controlling path connection such that the outputs of the first and second IF receivers are coupled to an IF transmitter, respectively if coincidence of the IDs is detected by the first comparator, the IF transmitter providing delays to the signal through the first path for delay adjustment such that the delay of the signal from the first path is the same as that through the second path;

a second comparator for comparing the signals from the respective first and second paths for a check as to whether the two signals are coincident;

a selector, in response to the coincident detection of the signals by the second comparator, for switching the paths from the first path over to the second path;

a third path ID detector for detecting the respective path IDs inserted by the first path ID inserter from the signal through the first path before the switching and the signal through the second path after the switching which checks whether the path IDs are coincident, detecting the path IDs inserted by the second and third path ID inserters from the signal through the first path before the switching and the signal through the second path after the switching responsive to the coincident detection of the coincidence of the signals, and detecting a change from the path ID identifying the first path to the path ID identifying the second path, and, if the path IDs inserted by the first path ID inserter are not coincident, or in the case of failure of detection of the change from the path ID identifying the first path to the path ID identifying the second path, producing that content.

In the present invention, when transmitting signals to the respective two paths having a routing length difference on the transmitting side, the transmission signal is given a signal identifying one and the other of the respective two paths before transmission to one and the other of the paths. On the receiving side, after the two paths have been intentionally switched in the state of non-instantaneous disconnection from one path to the other under external control, a difference between the signal identifying one of the paths and the signal identifying the other path is detected. Thus, it is possible to confirm that the non-instantaneous disconnection switching of the signal from one path to the other has actually been effected normally.

Other objects and features will be clarified from the following description with reference to attached drawings.

PREFERRED EMBODIMENTS OF THE INVENTION

An embodiment of the present invention will now be described with reference to the drawings.

Figure 1:
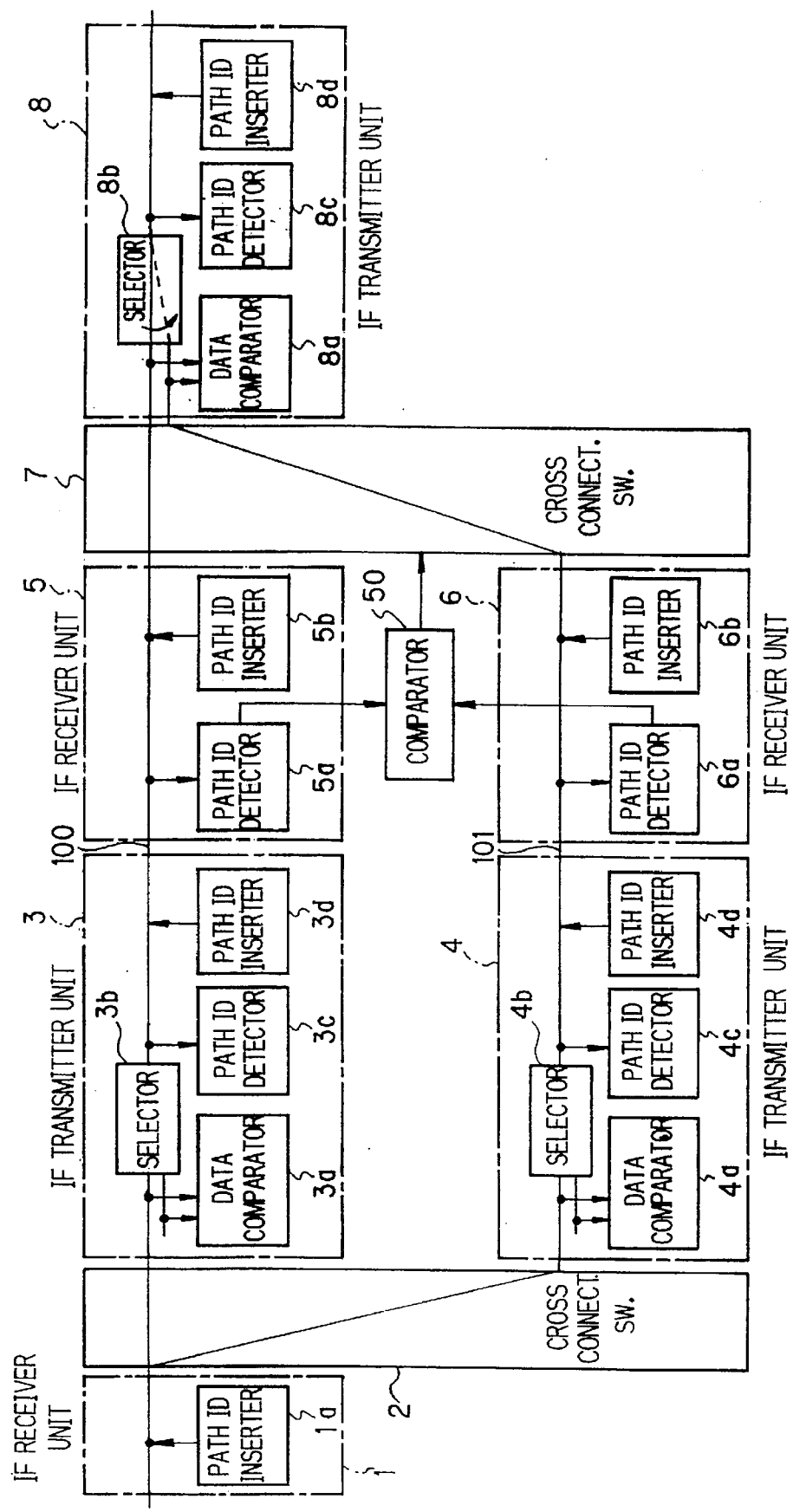
FIG. 1 shows a block diagram of a non-instantaneous disconnection switching system according to an embodiment of the present invention.
Figure 2:
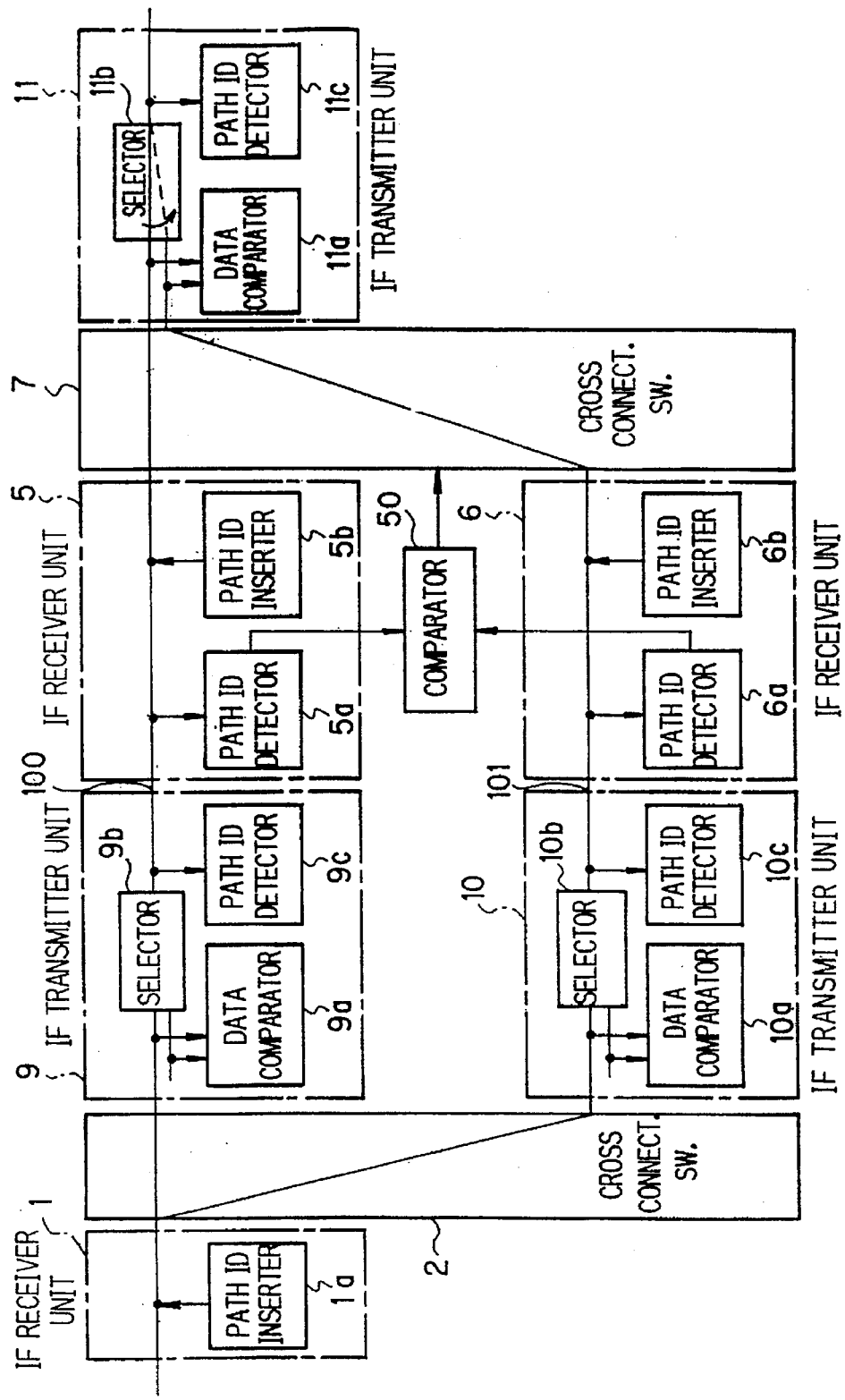
FIG. 2 shows a block diagram of the conventional non-instantaneous disconnection switching system.

FIG. 1 is a block diagram showing an embodiment of the present invention. Referring to FIG. 1, there is shown an embodiment of the non-instantaneous disconnection switching apparatus according to the present invention. The apparatus is the same in structure as the prior art example in FIG. 2 except that IF (interface) transmitter units 3 and 4 include path ID inserters 3d and 4d for providing their own path ID data specifying respective paths 100 and 101, wherein like constituent elements being are designated by like reference numerals and symbols. These elements operate the same as those in the prior art.

Referring to FIG. 1, IF (interface) receiver unit 1 includes ID inserter 1a. IF (interface) receiver units 5 and 6 include path ID detectors 5a and 6a and path ID inserters 5b and 6b, respectively. The path ID detector in the IF receiver unit 1 is not shown.

IF transmitter units 3, 4 and 8 include data comparators 3a, 4a and 8a, selectors 3b, 4b and 8b, path ID detectors 3c, 4c and 8c and path ID inserters 3d, 4d and 8d respectively.

The operation of the embodiment of the present invention will be described with reference to FIG. 1. Path 100 has a shorter routing length than that of path 101. Transmission between the opposite apparatuses which are connected to each other via the paths 100 and 101 is effected as follows.

First, the path ID inserter a gives a unique path ID to the signal received by the IF receiver unit 1. The cross connection switch 2 branches the signal with the unique path ID into two branched signals to be transmitted respectively to opposite apparatuses via the IF transmitter units 3 corresponding to 4 and paths 100 and 101. At this time, the IF transmitter units 3 and 4 operate such that the signal from the cross connection switch 2 is transmitted directly to the paths 100 and 101, but the path ID inserters 3d and 4d provide their own path IDs for identifying the respective paths 100 and 101 to the signals from the cross connection switch 2 before transmission to the paths 100 and 101.

In the opposite apparatuses, the path ID detectors 5a and 6a of the IF receiver units 5 and 6 detect the path IDs inserted in the path ID inserter 1a from the signals applied via the paths 100 and 101 and produce the detected ID to a comparator 50. This comparator 50 compares the detected path IDs and controls the cross connection switch 7 for path connection such that the outputs of the IF receiver units 5 and 6 are coupled to the IF transmitter unit 8, respectively if the IDs are coincident. The IF receiver units 5 and 6, like the IF receiver unit 1, are provided with path ID inserters 5b and 6b, but in this case the path ID inserters 5b and 6b are not used.

The IF transmitter unit 8 provides delays to the signal through the path 100 for delay adjustment such that the delay of the signal from the path 100 is the same as that through the path 101. In the IF transmitter unit 8, after the delay adjustment the data comparator 8a compares the signals from the respective paths 100 and 101 for a check as to whether the two signals are coincident. In response to the coincident detection of the signals from the paths 100 and 101 by the data comparator 8a, the selector 8b switches the paths from the path 100 over to the path 101. In this way, the non-instantaneous disconnection switching for path may be effected.

When the non-instantaneous disconnection path switching is effected by the selector 8b, the path ID detector 8c detects the respective path IDs inserted by the path ID inserter 1a from the signal through the path 100 before the switching and the signal through the path 101 after the switching and checks whether the path Ids are coincident.

In Response to the coincident detection of the accord of the signals, the path ID detector 8c detects the path IDs inserted by the path ID inserters 3d and 4d from the signal through the path 100 before the switching and the signal through the path 101 after the switching, and detects a change from the path ID identifying the path 100 to the path ID identifying the path 101. If the path IDs inserted by the path ID inserter 1a are not coincident, or in the case of failure of detection of the change from the path ID identifying the path 100 to the path ID identifying the path 101, the path ID detector 8c informs a controller (not shown) of that content.

In the IF transmitter units 3 and 4, the data comparators 3a and 4a, selectors 3b and 4b, and path ID detectors 3c and 4c operate such that the signal from the cross connection switch 2 is transmitted directly to the respective paths 100 and 101. Further, the path ID inserter 8d in the IF transmitter unit 8 provides no path ID identifying the succeeding path to the signal to be transmitted to the succeeding path.

As has been shown, with the individual path ID to the paths 100 and 101 inserted by the path ID inserters 3d and 4d in the IF transmitter units 3 and 4, with the switching of paths from the path 100 over to the path 101 done in the selector 8b in the opposite downstream IF transmitter unit 8, and with subsequent detection of a change in the path IDs inserted by the path ID inserters 3d and 4d by the path ID detector 8c, it is possible to confirm that non-instantaneous disconnection switching of signals is actually effected normally.

As has been described in the foregoing, in the non-instantaneous disconnection switching system according to the present invention, it becomes possible to confirm the fact that actually non-instantaneous disconnection switching of the signal has been done normally.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. A non-instantaneous disconnection switching method comprising the steps of:

providing a signal having a unique path ID and branching the signal into a first signal and a second signal that are to be respectively transmitted to first and second paths having different path lengths;

providing said first signal with a first path ID and thereafter transmitting said first signal over said first path;

providing said second signal with a second path ID and thereafter transmitting said second signal over said second path;

receiving said first and second signals transmitted over said first and second paths in receiving units and alternatingly selecting one of said first and second signals; and comparing the first and second path IDs associated with said first and second signals in order to confirm that non-instantaneous disconnection switching between said first and second signals has occurred normally.

2. A data transmission system between opposite apparatuses which are connected to each other via a first path and a second path comprising:

a first path ID inserter for giving a signal received by an IF receiver a unique path ID representative of a path which is connected to the IF receiver;

a cross connection switch for branching the signal with the unique path ID into two branched signals to be transmitted respectively to opposite apparatuses through first and second IF transmitters and the first and second paths, the first and second IF transmitters operating such that the signal from the cross connection switch is transmitted directly to the first and second paths;

a second and a third path ID inserters for providing their own path IDs to the signals from the cross connection switch for identifying the respective first and second paths before transmission to the first and second paths;

first and second path ID detectors of first and second IF receivers for detecting the path IDs inserted by the first path ID inserter from the signals applied via the first and second paths;

a first comparator for comparing the detected path IDs;

a second cross connection switch for controlling path connection such that the outputs of the first and second IF receivers are coupled to a third IF transmitter if coincidence of the IDs is detected by the first comparator, said third IF transmitter providing a delay to the signal transmitted through the shorter of the first and the second path such that the signals have no delay therebetween;

a second comparator for comparing the signals from the respective first and second paths to check whether the two signals are coincident;

a selector for switching the paths from the first path over to the second path in response to the coincident detection of the signals by the second comparator;

a third path ID detector for detecting the respective path IDs inserted by the first path ID inserter from the signal transmitted through the first path before the switching and the signal transmitted through the second path after the switching and checking whether the path IDs are coincident, said third path ID detector detecting the path IDs inserted by the second and third path ID inserters from the signal transmitted through the first path before the switching and the signal transmitted through the second path after the switching in response to the detection of coincident signals, wherein if the path IDs inserted by the first path ID inserter are not coincident, or in the case of failure of detection of a change between the path ID identifying the first path and the path ID identifying the second path, such malfunction is determined.

* * * * *